United States Patent [19]

Deng

[11] Patent Number: 5,565,100
[45] Date of Patent: Oct. 15, 1996

[54] ELEMENT-LOCATING DEVICE FOR A PURE WATER MAKER

[76] Inventor: Chung-Rong Deng, No. 145, Ta-Jung Street, Ta-Ya Hsiang, Taichung Hsien, Taiwan

[21] Appl. No.: 606,725

[22] Filed: Feb. 27, 1996

[51] Int. Cl.⁶ .................................................. B01D 63/00
[52] U.S. Cl. ................. 210/257.2; 210/252; 210/257.1; 210/450
[58] Field of Search ............................. 210/257.2, 195.1, 210/195.2, 652, 257.1, 450, 900; 220/189.06, 189.07

[56] References Cited

U.S. PATENT DOCUMENTS

| | | | |
|---|---|---|---|
| 3,984,319 | 10/1976 | Hobbard et al. | 210/195.2 |
| 4,626,346 | 12/1986 | Hall | 210/257.2 |
| 4,678,505 | 7/1987 | Morton | 210/257.2 |
| 4,743,372 | 5/1988 | Kumagai et al. | 210/195.2 |
| 4,752,389 | 6/1988 | Burrows | 210/257.2 |
| 4,880,535 | 11/1989 | Burrows | 210/257.2 |
| 5,108,590 | 4/1992 | Di Santo | 210/257.2 |

*Primary Examiner*—Ana Fortuna
*Attorney, Agent, or Firm*—Morton J. Rosenberg; David I. Klein

[57] ABSTRACT

An element-locating device for pure water maker which includes a water reservoir, three filters, a reverse osmotic membrane tube, a pump, a transformer and a board body on which the pump and the transformer are disposed. The above elements are disposed in the locating device including a box body having a rectangular cross-section and clamps respectively disposed on four corners of the box body. Each clamp includes two symmetrical first clamping portions and two symmetrical second clamping portions. The first clamping portions of the clamps abut against the water reservoir and the second clamping portions of the clamps abut against the filters or the reverse osmotic membrane tube respectively.

6 Claims, 6 Drawing Sheets

ELEMENT-LOCATING DEVICE FOR A PURE WATER MAKER

BACKGROUND OF THE INVENTION

The present invention relates to an element-locating device for pure water maker, which is able to locate a water reservoir in the center of the locating device and locate three filters and a reverse osmotic membrane tube on four corners of the water reservoir.

FIG. 1 shows a conventional reverse osmotic pure water maker in which a reverse osmotic membrane tube 13, a pump 14 and a transformer 15 are disposed on a locating board 16 and three filters 12 are installed under the locating board 16. The filters 12, pump 14 and reverse osmotic membrane tube 13 are communicated via pipe line 17 and the pure water treated by the reverse osmotic membrane tube 13 is transferred to the water tank 11 for drinking. Generally, the pure water maker is installed under a kitchen cabinet so that the pure water container in the water tank 11 is transferred to the faucet 18 above the cabinet by means of external pressure. Therefore, the water tank is pressurized to have an internal pressure of about 40 psi (pounds/in$^2$). For design and manufacturing, the cross-section of the tank is preferably circular for storing the pressure.

However, the assembly of the locating board 16, reverse osmotic membrane tube 13, pump 14, transformer 15 and three filters 12 has a profile totally different from that of the water tank 11 and two box bodies are needed to contain them. This causes inconvenience in transferring and installation. In addition, one pure water maker necessitates two separate box bodies so that the occupied space is increased and the number of the products contained in a container is reduced. This is not economical.

SUMMARY OF THE INVENTION

It is therefore a primary object of the present invention to provide an element-locating device for pure water maker, which is able to locate a water reservoir in the center of a box body of the locating device and locate three filters and a reverse osmotic membrane tube in the space between the water reservoir and four corners of the box body. Two cramps are disposed on each corner for abutting against and restricting and locating the water reservoir and filters the reverse osmotic membrane tube. The pump and transformer are disposed above or under the water reservoir so that the entire pure water maker can be installed in one box body to reduce the material and volume for packing.

The present invention can be best understood through the following description and accompanying drawing, wherein:

DETAILED DESCRIPTION OF THE PREFERRED EMBODIMENTS

Figure 1:
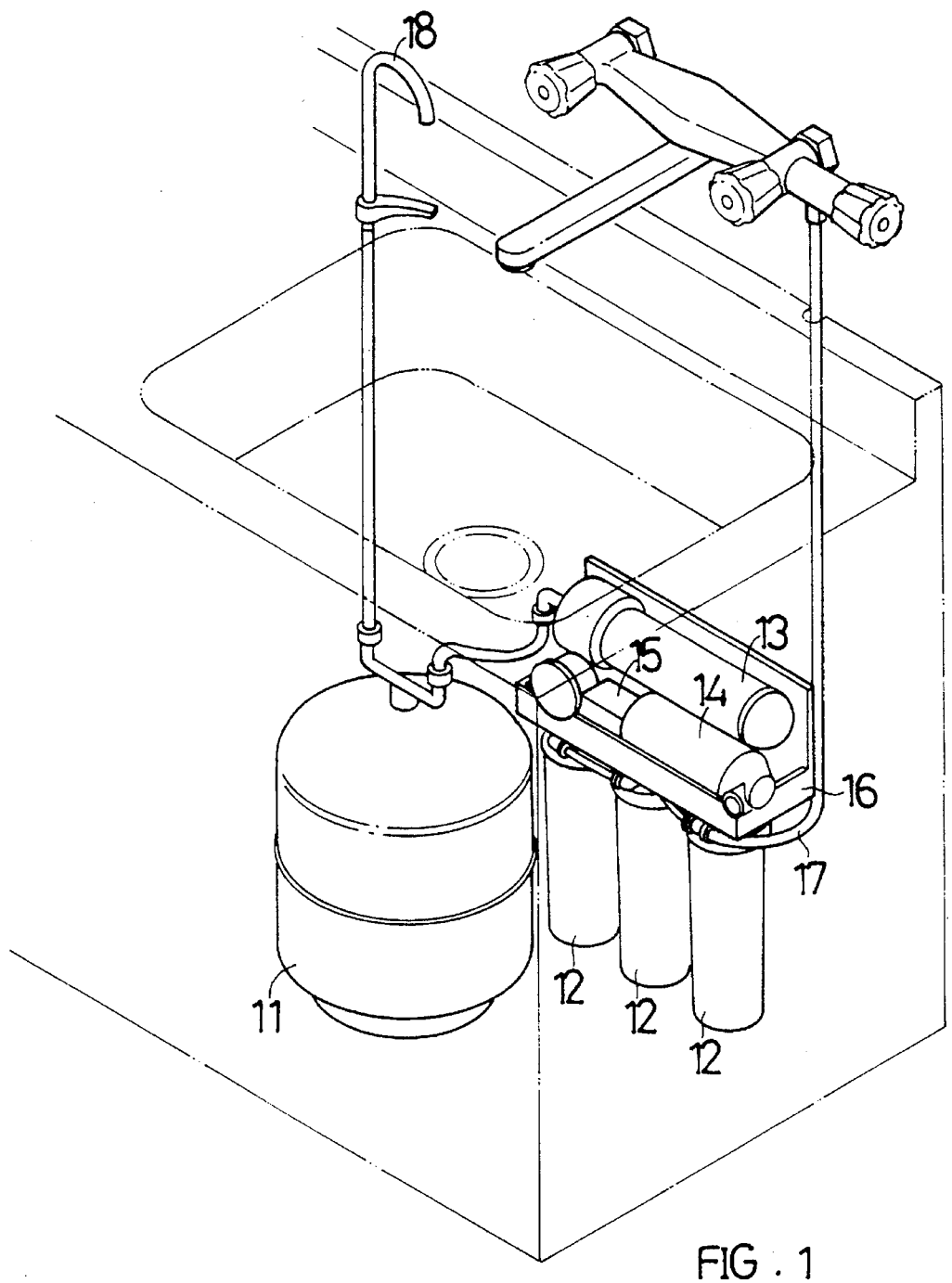
FIG. 1 is a perspective view of a conventional reverse osmotic pure water maker, showing the structure and installation thereof.
Figure 2:
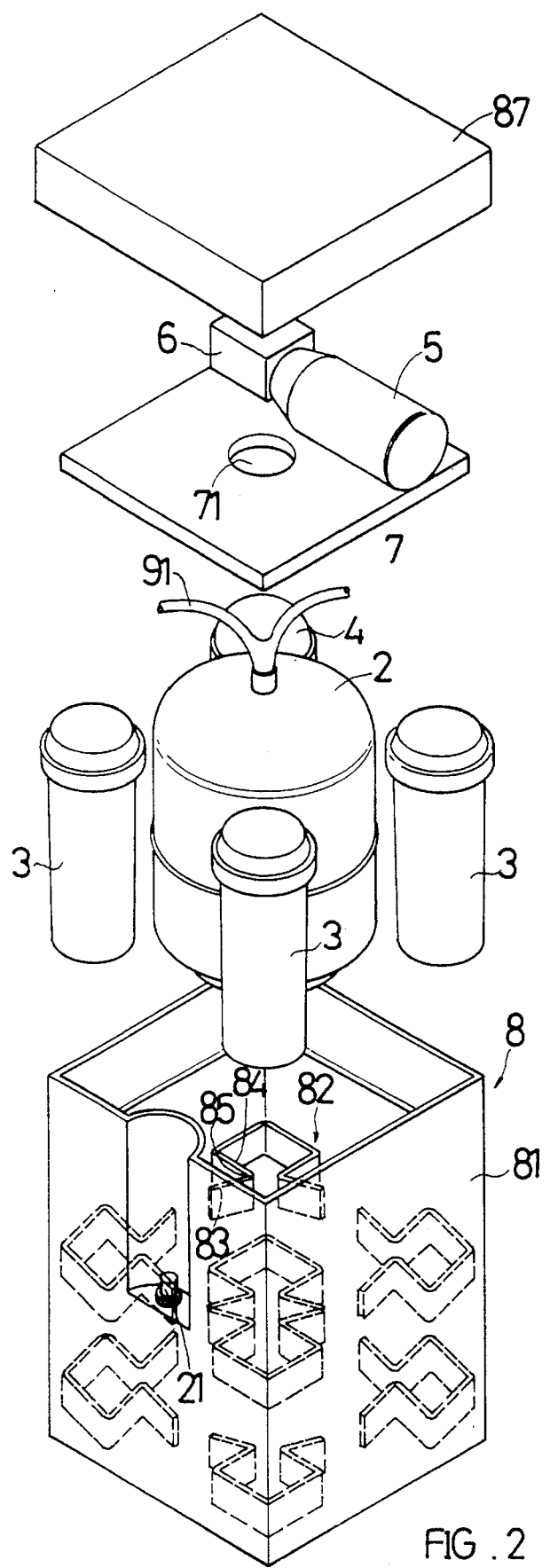
FIG. 2 is a perspective exploded view of a first embodiment of the present invention.
Figure 4:
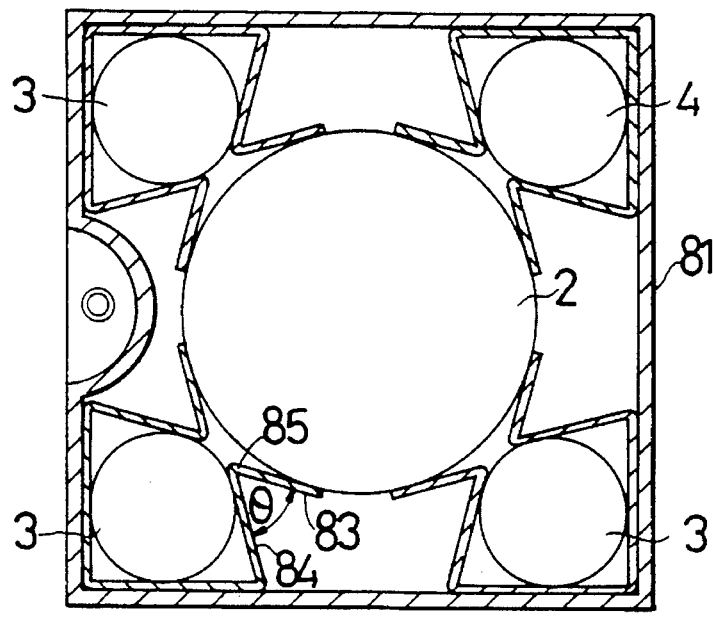
FIG. 4 is a sectional view taken along line VI—VI of FIG. 3.
Figure 3:
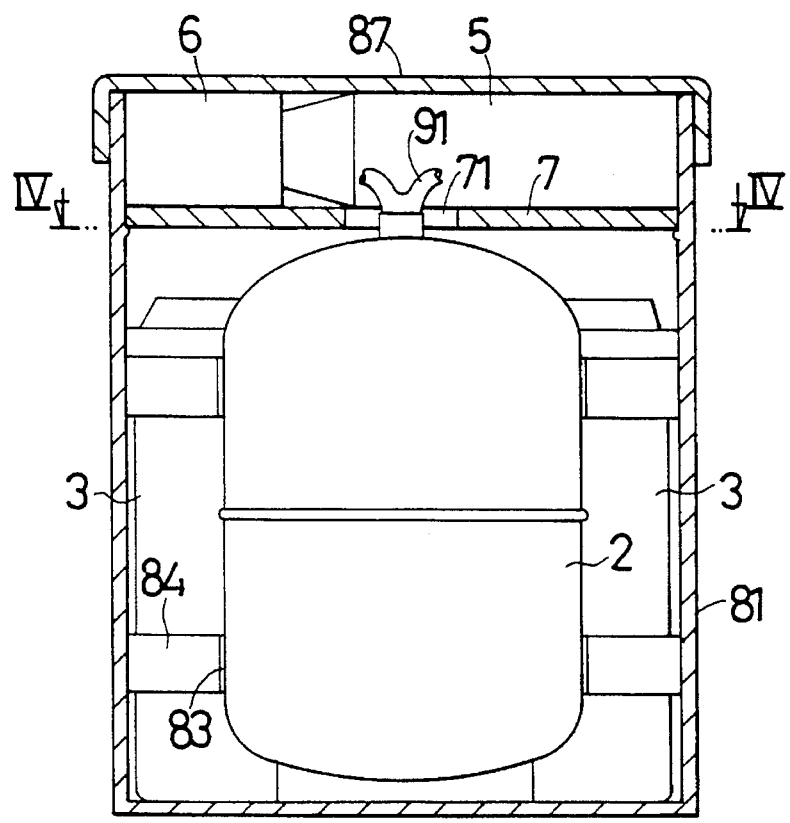
FIG. 3 is a side view according to FIG. 2.

Please refer to FIGS. 2, 3 and 4. According to a first embodiment of the present invention, the locating device is used in a reverse osmotic pure water maker which includes a water reservoir 2, three filters 3, a reverse osmotic membrane tube 4, a pump 5 and a transformer 6. The pump 5 and the transformer 6 are disposed on a board body 7.

The above elements are disposed in a locating device 8 and communicated with each other via water tubes. The locating device 8 includes a box body 81 having a rectangular cross-section, an upper cap 87 and clamps 82 respectively disposed on four corners of the box body 81. Each clamp 82 includes two symmetrical first clamping portions 83 and two symmetrical second clamping portions 84 integrally flexibly connected each other at bent ends 85 with an angle θ. That is, the first clamping portion 83 is connected with the second clamping portion 84 at the bent end 85. For each cramp 82, two end portions of the second clamping portions 84 are connected to these two first clamping portions 83 at the bent ends 85 respectively, and the other end portions of the second clamping portion 84 are disposed on two adjacent faces of a corner of the box body 81. The distance between these two bent ends 85 of the clamp 82 is relatively short (i.e. it is shorter than the distance between the open ends of each cramp 82 as shown in FIGS. 2 and 4).

The box body 81 is formed with a guide hole 92 for power cable 61 of the transformer 6 to pass outside he box body 81 and a water entrance 93 communicated with the filters 3.

The first clamping portion 83 of each clamp 82 contacts with the water reservoir 2, while the symmetrical second clamping portions 84 on each corner respectively contact with the three filters 3 and the reverse osmotic membrane tube 4.

The water reservoir 2 is a pressurized tank having internal pressure of about 40 psi and connected with a water discharging tube 21 outside the box body 81.

The board body 7 disposed with the pump 5 and the transformer 6 is disposed on the top portion of the box body 81 and located on upper side of the cramps 82 and the reservoir 2. The board body 7 is formed with a hole 71 for the water supply tube to pass therethrough.

According to the above arrangements, the three filters 3 and the reverse osmotic membrane tube 4 are respectively located in the space between the water reservoir 2 and the four corners of the box body 81 so that the remaining space is effectively used. Please refer to FIG. 4. In the first embodiment, two clamps 82 are disposed respectively between the three filters 3 and the reverse osmotic membrane tube 4 and the water reservoir 2. By means of the flexibility of the bent clamps 82, eight first clamping portions 83 serve to locate the water reservoir 2 and two second clamping portions 84 serve to locate one filter 3 or the reverse osmotic membrane tube 4. Therefore, in a natural state, the eight first clamping portions 83 define an inner diameter less than the outer diameter of the water reservoir 2 so that the water reservoir 2 can stretch out the first clamping portions 83, making the first clamping portions 83 compress the second clamping portions 84 so as to further compress a filter 3 or the reverse osmotic membrane tube 4.

In addition, the housing of the filter 3 or the reverse osmotic membrane tube 4 has enough hardness for bearing the compressing force of the second clamping portions 84 and for exerting a reaction force onto the first clamping portions 83, making the first clamping portions 83 further compress the water reservoir 2 so as to achieve a bi-directional compressing and restricting effect. Therefore, all the elements of the pure water maker can be installed in the box body 81 and the occupied space during transferring and assembling is greatly reduced in comparison with the conventional measure.

Figure 5:
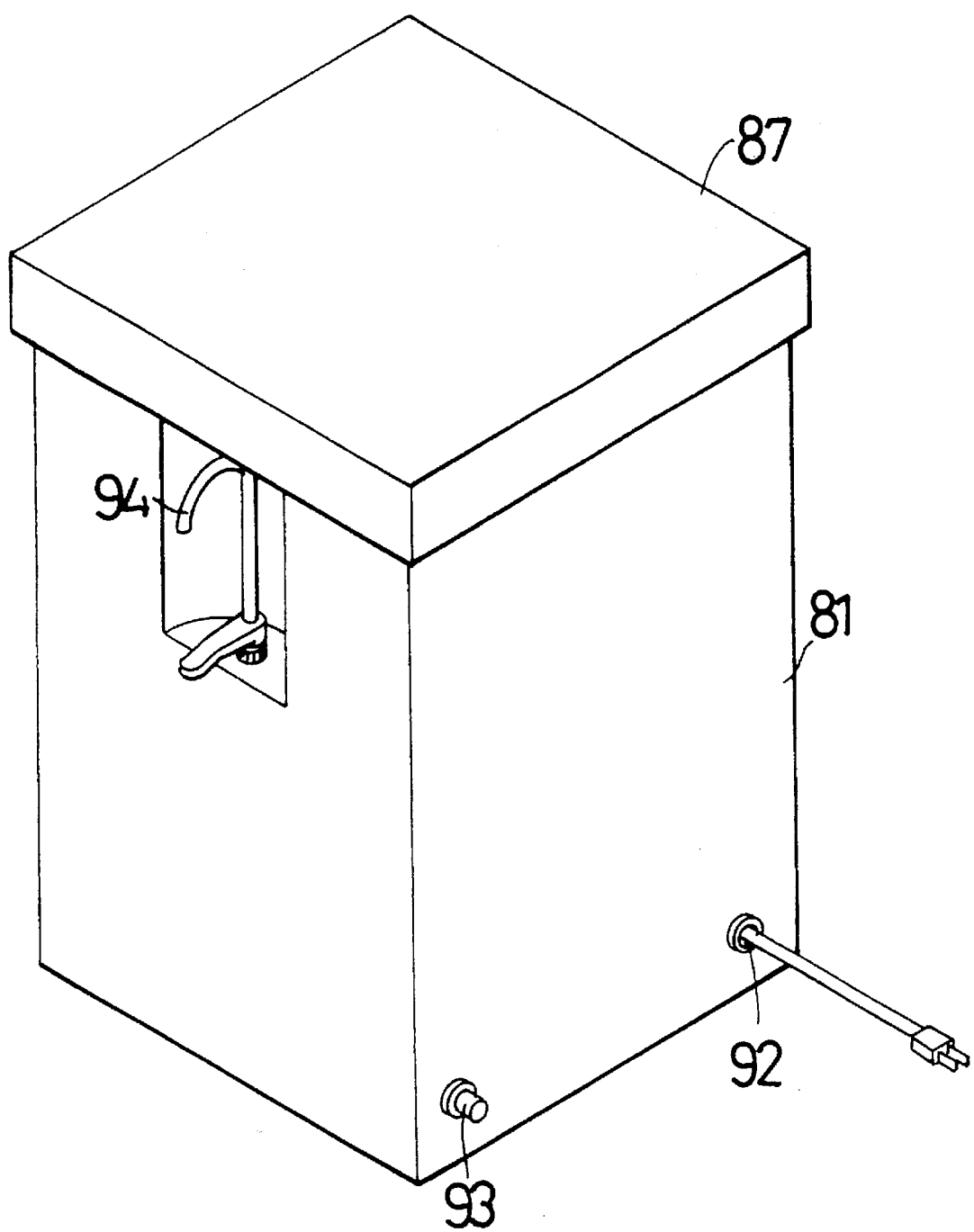
FIG. 5 is a perspective assembled view of the first embodiment of the present invention.

Please refer to FIG. 5. According to the first embodiment, the pure water maker can be connected to a power socket and communicated with a water inlet and the treated pure water can be directly discharged from a goose-type faucet 94 for drinking.

Figure 6:
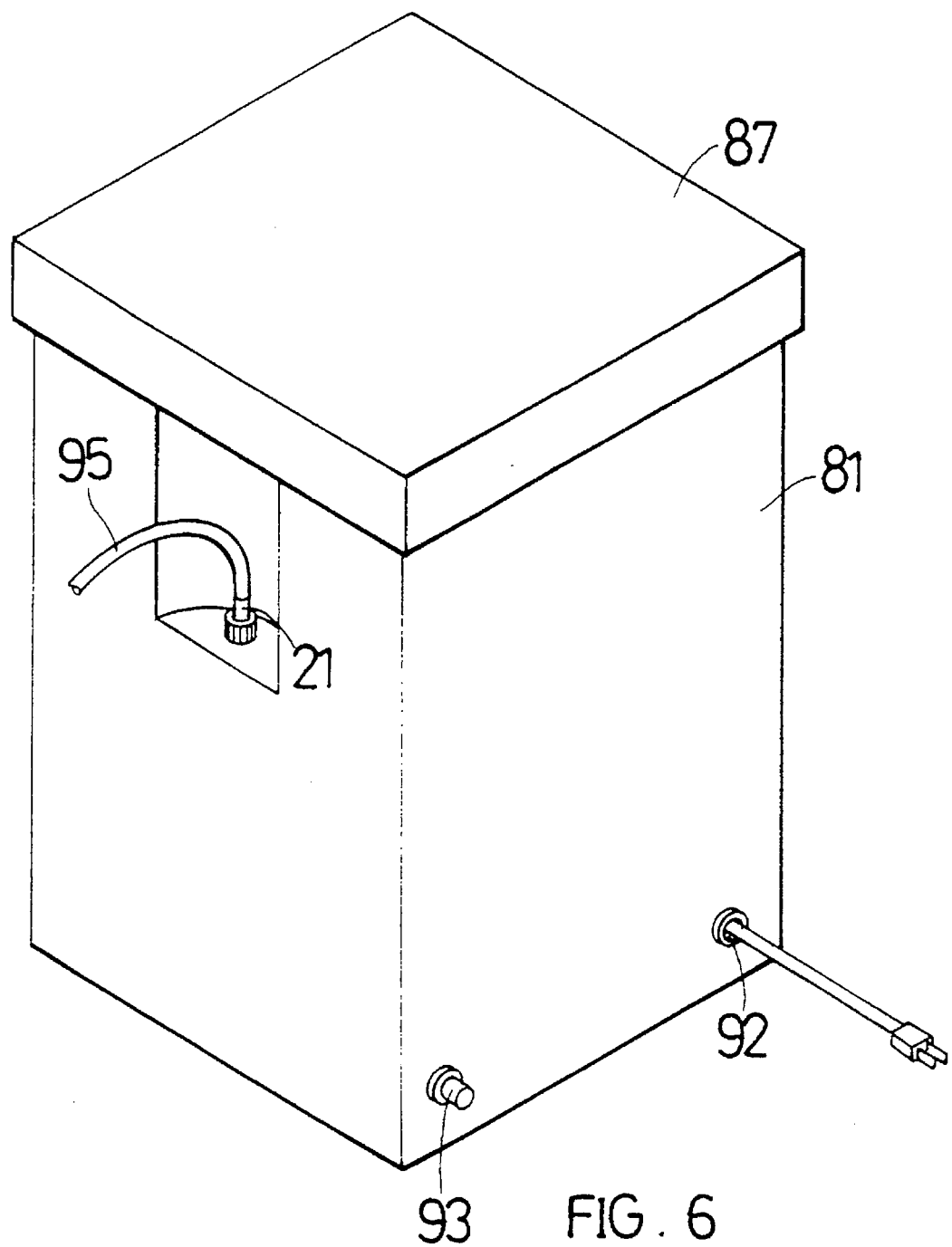
FIG. 6 is a perspective assembled view of the second embodiment of the present invention.

Please refer to FIG. 6 which shows a second embodiment of the present invention, in which the water discharging tube 21 is connected to a faucet of kitchen cabinet via a water tube 95.

Figure 7:
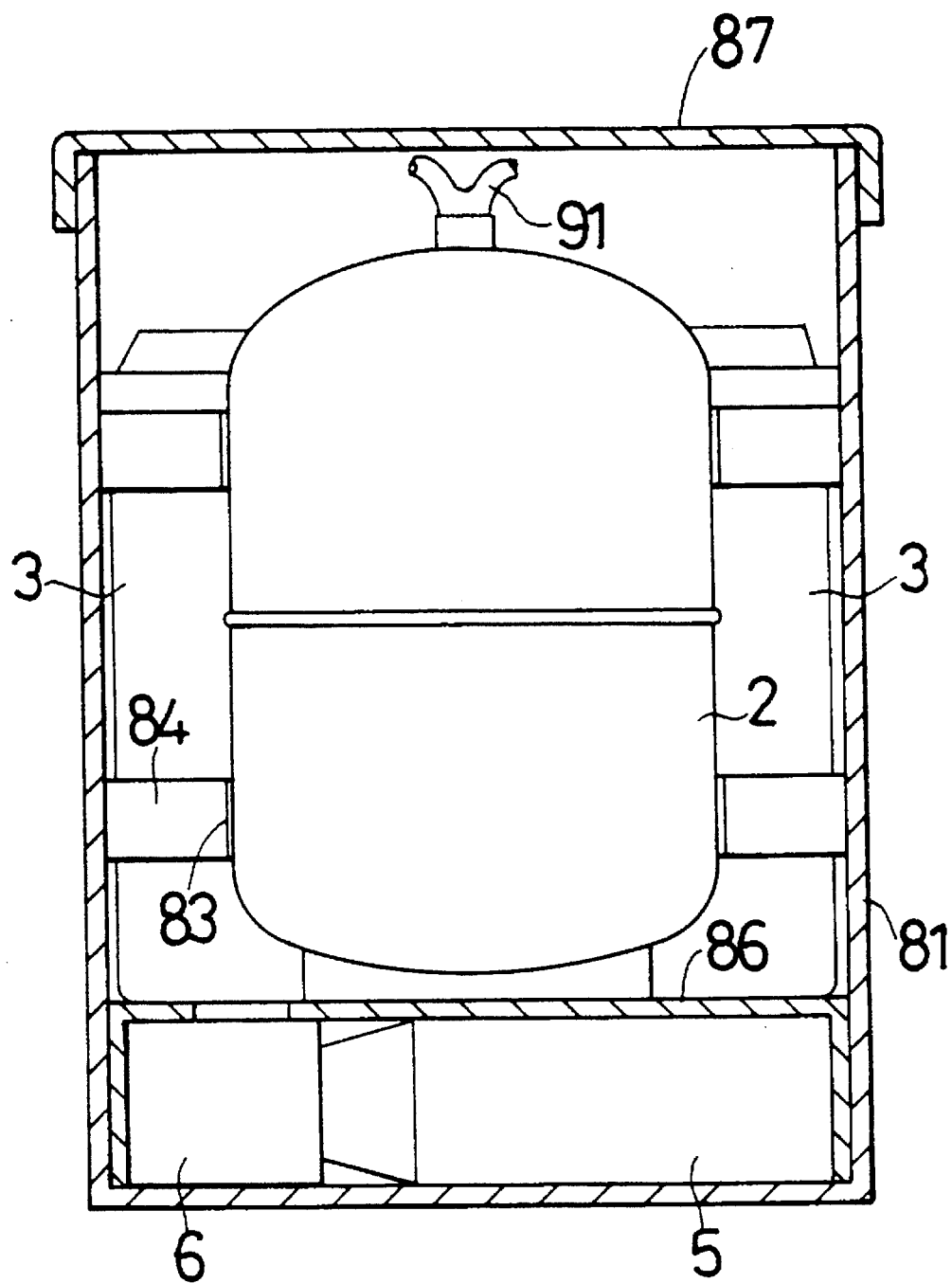
FIG. 7 is a side view of a third embodiment of the present invention.

Please refer to FIG. 7 which shows a third embodiment of the present invention, in which the board body 7 disposed with the pump 5 and the transformer 6 is disposed on the bottom of the box body 81 and located under the clamps 82 and the water reservoir 2 by a partitioning board 86.

Alternatively, the water reservoir 2 can be a non-pressurized tank and the water discharging opening is positioned below the tank.

It is to be understood that the above description and drawings are only used for illustrating some embodiments of the present invention, not intended to limit the scope thereof. Any variation and derivation from the above description and drawings should be included in the scope of the present invention.

What is claimed is:

1. An element-locating device in combination with a pure water maker which include a water reservoir, three filters, a reverse osmotic membrane tube, a pump and a transformer, wherein the pump and the transformer are disposed on a board body, said locating device being characterized in that:

said water maker elements are disposed in the locating device comprising a box body having a rectangular cross-section and clamps respectively disposed on four corners of the box body, each clamp including two symmetrical first clamping portions and two symmetrical second clamping portions, the first clamping portions of the clamps abutting against the water reservoir, and the second clamping portions of the clamps abutting against the filters or the reverse osmotic membrane tube respectively.

2. An element-locating device as claimed in claim 1, wherein the first clamping portions and second clamping portions of each clamp are integrally flexibly connected with each other at bent ends with an angle (θ), two end portions of these two second clamping portions being connected to these two first clamping portions at the bent ends, the other end portions of said second clamping portions being disposed on adjacent faces of each corner of the box body, and the distance between these two bent ends of said clamp being relatively short.

3. An element-locating device as claimed in claim 1, wherein the board body disposed with the pump and the transformer is disposed on a top portion of the box body and located above the clamps and water reservoir.

4. An element-locating device as claimed in claim 1, wherein the board body disposed with the pump and the transformer is disposed on a bottom portion of the box body and located under the clamps and water reservoir by a partitioning board.

5. An element-locating device as claimed in claim 1, wherein the water reservoir is a pre-pressurized tank having internal pressure of about 40 psi.

6. An element-locating device as claimed in claim 1, wherein the box body is formed with a guide hole and a water entrance.

\* \* \* \* \*